United States Patent
Husby

(10) Patent No.: US 6,793,243 B2
(45) Date of Patent: Sep. 21, 2004

(54) AIRBAG DEPLOYMENT RATE SENSOR WITH SPOOL BRAKE

(75) Inventor: Harald Snorre Husby, Lakeland, FL (US)

(73) Assignee: Key Safety Systems, Inc., Sterling Heights, MI (US)

( * ) Notice: Subject to any disclaimer, the term of this patent is extended or adjusted under 35 U.S.C. 154(b) by 84 days.

(21) Appl. No.: 10/359,257

(22) Filed: Feb. 6, 2003

(65) Prior Publication Data

US 2004/0155445 A1 Aug. 12, 2004

(51) Int. Cl.[7] .................................................. B60R 21/16
(52) U.S. Cl. ................................. 280/735; 280/743.2
(58) Field of Search ............................. 280/735, 743.2, 280/731, 732, 736, 742

(56) References Cited

U.S. PATENT DOCUMENTS

| | | | | |
|---|---|---|---|---|
| 5,762,367 A | * | 6/1998 | Wolanin ..................... | 280/736 |
| 6,129,379 A | | 10/2000 | Specht ........................ | 280/735 |
| 6,250,677 B1 | | 6/2001 | Fujimura ................... | 280/743.2 |
| 6,315,323 B1 | * | 11/2001 | Pack, Jr. .................... | 280/743.2 |
| 6,328,335 B1 | * | 12/2001 | Mueller ...................... | 280/735 |
| 6,371,517 B1 | | 4/2002 | Webber et al. ............. | 280/736 |
| 6,425,603 B1 | * | 7/2002 | Eschbach ................... | 280/743.2 |
| 6,511,094 B2 | * | 1/2003 | Thomas et al. ............ | 280/743.2 |
| 6,709,010 B2 | * | 3/2004 | Dominissini et al. ..... | 280/730.2 |
| 6,746,045 B2 | * | 6/2004 | Short et al. ................ | 280/736 |
| 2004/0090053 A1 | * | 5/2004 | White et al. ............... | 280/735 |
| 2004/0094941 A1 | * | 5/2004 | Waid et al. ................ | 280/736 |

FOREIGN PATENT DOCUMENTS

| | | |
|---|---|---|
| EP | 0812741 | 3/1997 |
| EP | 0990567 | 9/1999 |

OTHER PUBLICATIONS

Pending unpublished US application 10/321524 filed Dec. 18, 2002 by Husby et al. for Airbag deployment velocity sensor.

* cited by examiner

Primary Examiner—Paul N. Dickson
Assistant Examiner—Laura B Rosenberg
(74) Attorney, Agent, or Firm—Lonnie Drayer; Patrick Steinnon

(57) ABSTRACT

An airbag deployment rate sensor employs a tape or string that is wound on a spool and connected to the fabric of an airbag cushion so that as the airbag deploys, tape or string is pulled from the spool causing it to rotate. A brake is applied to the spool to prevent the buildup of momentum and so the tape and the spool will come to a rapid stop when the tape is no longer being withdrawn from the spool because the portion of the airbag to which the tape is connected has collided with an object. A sensor is positioned to detect rotation of the spool and so to monitor the rate at which tape or string is being withdrawn.

25 Claims, 5 Drawing Sheets

AIRBAG DEPLOYMENT RATE SENSOR WITH SPOOL BRAKE

FIELD OF THE INVENTION

The present invention relates to airbags and sensors used to control airbag deployment in general and to sensors which monitor the actual deployment sequence in particular.

BACKGROUND OF THE INVENTION

Airbags were originally developed as a passive restraint system, but are known to work best in combination with seatbelts and other safety systems. Although airbags contribute to the overall safety of occupants of an automobile, they can present a danger to an occupant who is positioned too close to an airbag when it deploys. This condition, where the occupant is positioned so that airbag deployment might be dangerous, is referred to as the occupant being "out of position." Various systems have been developed to detect an "out of position" occupant. Sensor systems designed to detect the occupant's position often require constant monitoring so that in the event of a crash the occupant's position is known. Sensor systems designed to detect the position of the occupant have been proposed based on ultrasound, optical, or capacitance sensors. Constant monitoring of sensors, which may have high data rates, requires the design of algorithms which can reduce sensor data to a single condition or a limited number of data conditions which can be used in an airbag deployment decision logic to prevent airbag deployment or for a duel stage airbag to select the level of deployment. Maintaining data integrity between the non-crash positional data, and positional data needed during airbag deployment is complicated by the noisy environment produced by a crash. Dealing with data integrity issues requires increased processor capabilities and algorithm development, which also requires additional testing.

Prior art approaches attempt to determine, based on various sensors, the distance between the airbag and a vehicle occupant before the airbag is deployed. In many instances, the vehicle occupant will not be too close to the airbag at the time the decision to deploy the airbag is made, but, because of the rate at which the occupant is approaching the airbag, the occupant will be too close when the airbag is actually deploying. To handle these situations, more sophisticated sensors and algorithms are needed to attempt to predict the occupant's position when the airbag is actually deployed or nearly completely deployed. The ideal airbag deployment system functions so that the airbag deploys fully or nearly fully before the occupant engages the airbag. Existing systems inhibit airbag deployment when, based on various sensors and algorithms, it is determined that, because of the position of the vehicle occupant, the bag is more likely to harm than to benefit the occupant. Successfully creating a sensor and algorithm system is complicated because there is usually very little delay between the decision to deploy and the actual deployment. Rapid airbag deployment is desirable because the maximum benefit from an airbag is achieved by early deployment. However, more time before deployment maximizes the information available for determining whether deployment is necessary. The desire to maximize effective deployment of the airbag while minimizing unnecessary deployment creates a tension between waiting for more information and deploying immediately. Therefore, once sufficient information is available, deployment typically follows nearly immediately.

Therefore, a system which employs occupant position sensors and algorithms must be able to supply at all times an indication of whether airbag deployment should be inhibited so that the inhibit decision can be applied whenever the airbag deployment decision occurs. This means the sensors and algorithms used to develop the occupant position inhibit signal cannot be optimized to deal with a specific time frame in which the actual deployment decision is made. The end result is that such algorithms may be less accurate than desired because they must predict events relatively far in the future—perhaps tens of milliseconds. One known type of sensor shown in European Patent application EP 0990567A1 employs a plurality of tapes which extend between the front of the airbag cushion and a dispensing cartridge mounted on the airbag housing. Tape extraction sensors within the cartridge monitor markings on the tape to determine the rate at which tape is being withdrawn from the cartridge. The tape extraction sensors detect airbag impact with an occupant by a decrease in airbag velocity as measured by the rate of tape withdrawal from the cartridge. Improvements are needed to the known tape cartridges to improve the functionality and reliability of the tape type bag deployment monitoring sensors.

SUMMARY OF THE INVENTION

The airbag deployment rate sensor of this invention employs a tape or string which is wound on a spool and connected to the fabric of an airbag cushion so that as the airbag deploys, tape or string is pulled from the spool, causing it to rotate. A brake is applied to the spool to prevent the buildup of momentum and so that the tape and the spool will come to a rapid stop when the tape is no longer being withdrawn from the spool because the portion of the airbag to which the tape is connected has collided with an object. A sensor is positioned to detect rotation of the spool and so to monitor the rate at which tape or string is being withdrawn. This provides a measure of the movement of the portion of the airbag to which the tape or string is attached. A braking force is applied to the spool by biasing a shoe against a peripheral rim of the spool, or by biasing a shoe against an upper or lower surface of the spool. In yet another embodiment, the stub shaft about which the spool is mounted is split and biased to supply a braking force against the innermost bearing surface that is engaged with the stub shaft. Rotation rates may be monitored by passing a beam of light through one or more axial openings in the disk of the spool. Alternatively, one or more small magnets may be mounted to rotate with the spool, the magnets being detected by a magnetic flux sensor such as a Hall effect sensor, a GMR sensor, or a reed switch. In another alternative embodiment, a magnet may be positioned above the rotating spool, and the spool may contain magnetic shield elements that pass over a magnetic flux sensor positioned beneath the magnet. If a magnet is mounted on the spool, a simple wire positioned near the spool will experience an induced current. Finally, a spring motor type spring may be positioned between a central stub shaft and the tape or string containing spool to act as a brake.

It is a feature of the present invention to provide a means for detecting when a portion of an airbag cushion impacts an object.

It is another feature of the present invention to detect the rate at which a portion of an airbag cushion is deploying by monitoring the speed of rotation of a spool from which a tape or string which is attached to the portion of the airbag is withdrawn.

It is a further feature of the present invention to provide a sensor for determining the deployment rate of a portion of an airbag cushion that does not require an encoded tape or string.

It is a yet further feature of the present invention to provide a tape or string dispenser which can be used with a wide variety of sensors to detect the rate at which tape or string is drawn from the dispenser.

Further features and advantages of the invention will be apparent from the following detailed description when taken in conjunction with the accompanying drawings.

DETAILED DESCRIPTION OF THE INVENTION

Figure 9:
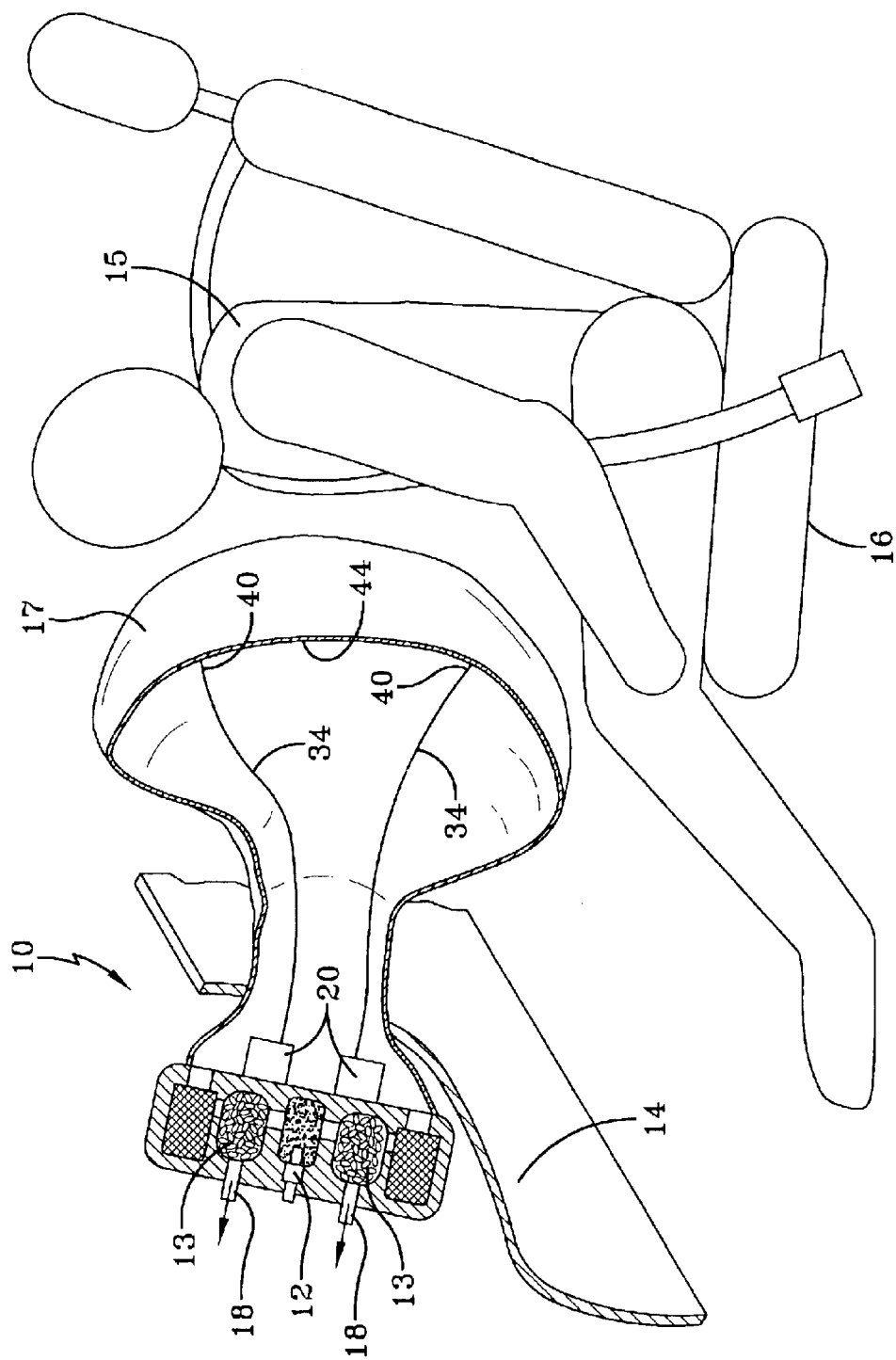
FIG. 9 is an isometric view, partially cut away in section, of an airbag module as the airbag cushion is deployed.

Referring more particularly to FIGS. 1–9, wherein like numbers refer to similar parts, an airbag module 10 deploying an airbag cushion 17 is shown in FIG. 9. An airbag housing 11 contains an igniter 12 and a quantity of gas generant 13 such as 5-aminotetrazole and is mounted behind an instrument panel 14. A vehicle occupant 15 is seated on a vehicle seat 16 facing the airbag cushion 17. Strings 34 are fastened to the inside surface 44 of the airbag cushion 17, and are retained within dispensing cartridges 20 mounted to or behind the airbag housing 11. The cartridges 20 are mounted fixed with respect to the airbag housing so the relative movement of the airbag cushion 17 can be measured. When the airbag module 10 is activated, the airbag cushion 17 deploys toward the vehicle occupant 15, and the strings 34 are withdrawn from the cartridges 20. The purpose of the cartridges 20 and the strings 34 which are withdrawn from the cartridges 20 is to allow the detection of an "out of position" vehicle occupant and adjust or stop the deployment of the airbag cushion in response to detecting the "out of position" vehicle occupant.

Figure 2:
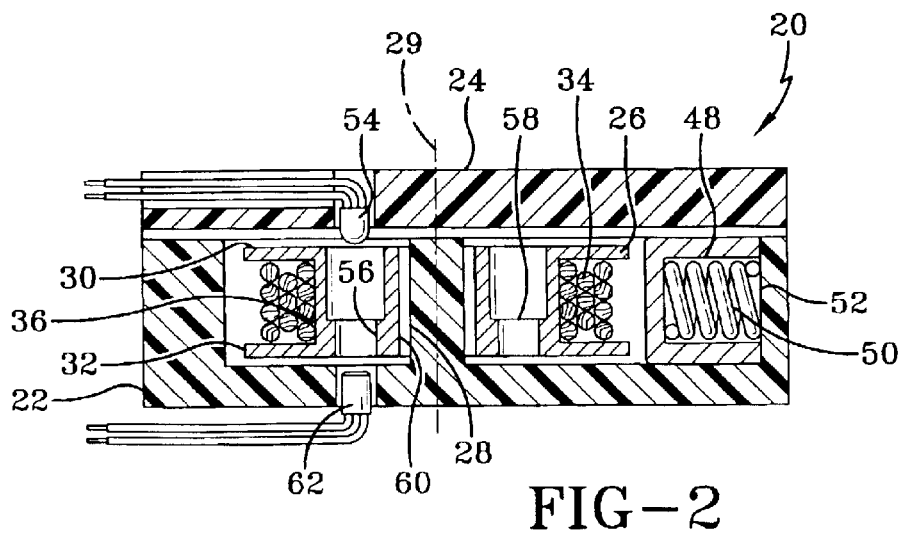
FIG. 2 is a cross-sectional view of the airbag deployment rate sensor of FIG. 1 taken along section line 2—2.

For simplicity in signal processing, an AC signal is generated by detecting rotation rate of spool 26, shown in FIG. 2, as string 34 is withdrawn from the dispensing cartridge 20. The AC signal can be processed and amplified and filtered in a way which may have benefits in terms of overcoming sources of noise, simplicity of processing, and reliability of algorithms. The information from the sensors which detect the rotation of the spool 26 is sent to an electronic control unit which can be used to control vents 18 which may be squib activated, or otherwise activated to let gases out of the airbag housing 11 to slow or stop inflation. Opening vents almost instantaneously reduces the pressure in the airbag cushion 17.

Figure 1:
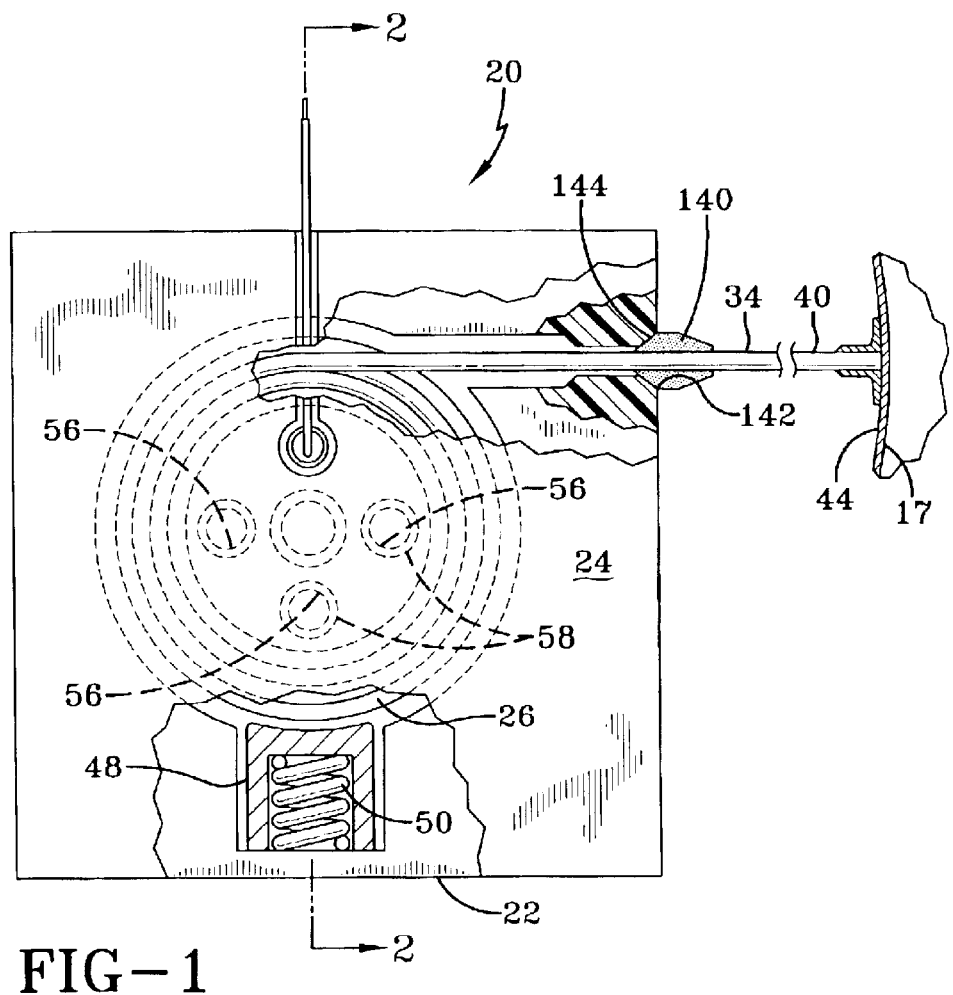
FIG. 1 is a top plan view, partially cut away in section, of the airbag deployment rate sensor of this invention.

The dispensing cartridge 20 has a housing 22 and a cover 24. Contained within the housing 22 is the spool 26, which is mounted for rotation about a central stub shaft 28, and an axis 29 defined by the stub shaft 28. The spool 26 has upper 30 and lower 32 spool flanges between which is wound a quantity of lightweight line 34. The line may be a string, filament, or flattened tape. As used herein and in the claims "string" is understood to refer to a flexible elongated member having any cross-sectional shape, not just a circular cross sectional shape. The line is preferably fixed to the spool to assure rotation of the spool as the line is extracted. The line 34 is wound onto a cylindrical surface 36 extending between the upper spool flange 30 and the lower spool flange 32. As shown in FIG. 1, one end 40 of the string 34 extends from the spool to an opening 142 in the housing 22 and is attached to an inside wall portion 44 of an airbag cushion 17. As the airbag cushion 17 is inflated, it draws string 34 from the housing 22 causing the spool 26 to rotate.

By monitoring the rate of rotation of the spool 26, the rate at which string 34 is withdrawn is monitored, and the rate at which string 34 is withdrawn from the housing 22 corresponds with the velocity of the airbag wall portion 44 to which the string 34 is attached. In order to be able to detect when the airbag wall portion 44 decreases in velocity, a brake 48 is provided within the housing 22, as shown in FIG. 1, which operates against the spool 26 to overcome the momentum of the spool which would keep the spool 26 rotating even when string withdrawal has slowed or stop. The brake 48, as shown in FIGS. 1–2, is biased by a spring 50 away from a wall portion 52 of the housing 22 so as to engage against the upper and lower spool flanges 30, 32. Friction between the brake 48 and the spool flanges 30, 32 is selected so that the string 34 pulled by the expanding airbag cushion 17 is readily extracted from the cartridge 20, but rotation of the spool 26 is adjusted essentially instantaneously to correspond with the string extraction rate. The forward velocity of the airbag cushion 17 slows in response to impacting an object. Thus, by monitoring the rotation rate of the spool 26, the impact of the airbag cushion 17 with an "out of position occupant" can be detected.

The rate of rotation of the spool 26 is detected by passing light from a light source 54 such as an LED, through openings 56 in a flange 58 which extends between the cylindrical surface 36 and an inner hub 60 surrounding the stub shaft 28. A light detecting sensor 62 is positioned opposite the light source 54 to receive light passing through the openings 56. As illustrated in FIG. 1, the flange 58 may have four openings 56 so that light is detected by the sensor 62 four times as the spool 26 rotates once.

Figure 3:
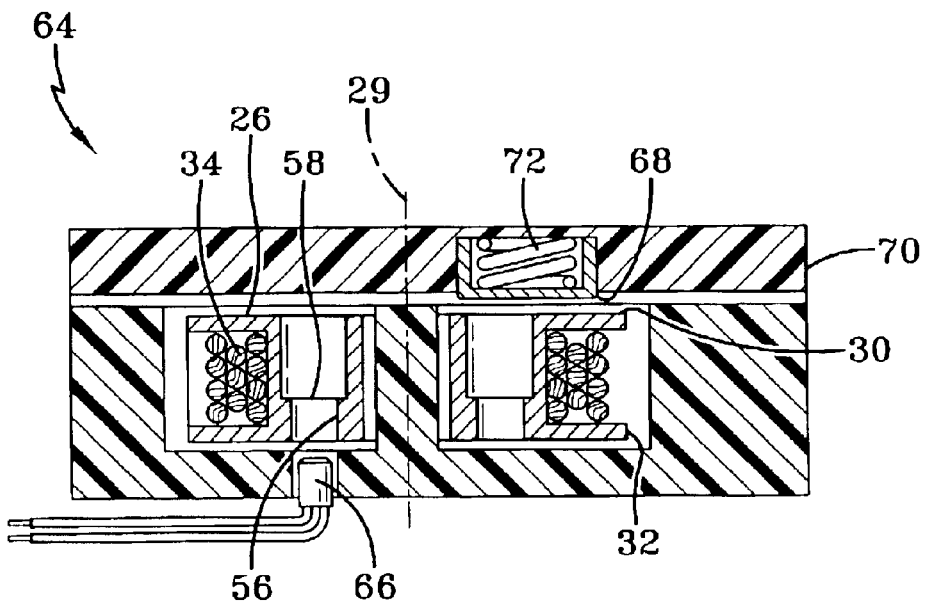
FIG. 3 is a side elevational cross-sectional view of an alternative embodiment rate sensor of this invention.

An alternative embodiment dispensing cartridge 64 is illustrated in the FIG. 3, wherein a light source and a light sensor 66 are combined and positioned below the spool 26. Through openings 56 in the flange 58 of the spool 26 reduce the amount of light reflected back to the sensor 66 and so it is the absence of light on the sensor 66 which indicates rotation of the spool 26. An alternative brake 68 is positioned within a cover 70. The brake 68 is biased by a spring 72 positioned between the cover and the brake, so that the brake pushes downwardly in on the upper flange 30 of the spool 26 to cause a braking friction which overcomes the momentum of the spool and the string 34.

Figure 4:
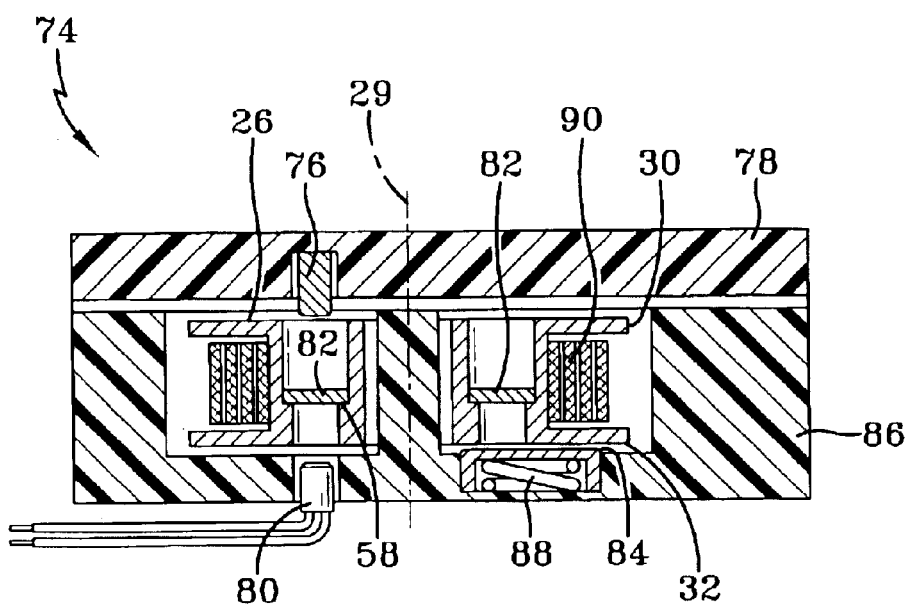
FIG. 4 is a side elevational cross-sectional view of another alternative embodiment rate sensor of this invention.

A further alternative embodiment tape dispenser cartridge 74 is shown in FIG. 4. A magnet 76 contained within the cover 78 is positioned above the spool 26 and a magnetic field sensor 80 such as a GMR sensor, a Hall sensor, or a reed switch is positioned below the spool 26. A magnetic shunt material 82 such as Mu metal or other ferromagnetic material is mounted at discrete locations on the flange 58 to selectively block a magnetic field produced by the magnet 76. The rotation of the spool 26 and the shunt material 82 mounted thereon causes the magnetic field sensor to be selectively activated. Thus, the rate of rotation of the spool can be detected by the frequency of the output signal of the magnetic field sensor 80. A brake 84 is incorporated into the housing 86 beneath the spool 26. A spring 88 biases the brake 84 against the lower flange 32 of the spool 26 to overcome momentum of the spool 26 and tape 90. The tape 90 may be woven or may be a plastic or metal tape.

Figure 5:
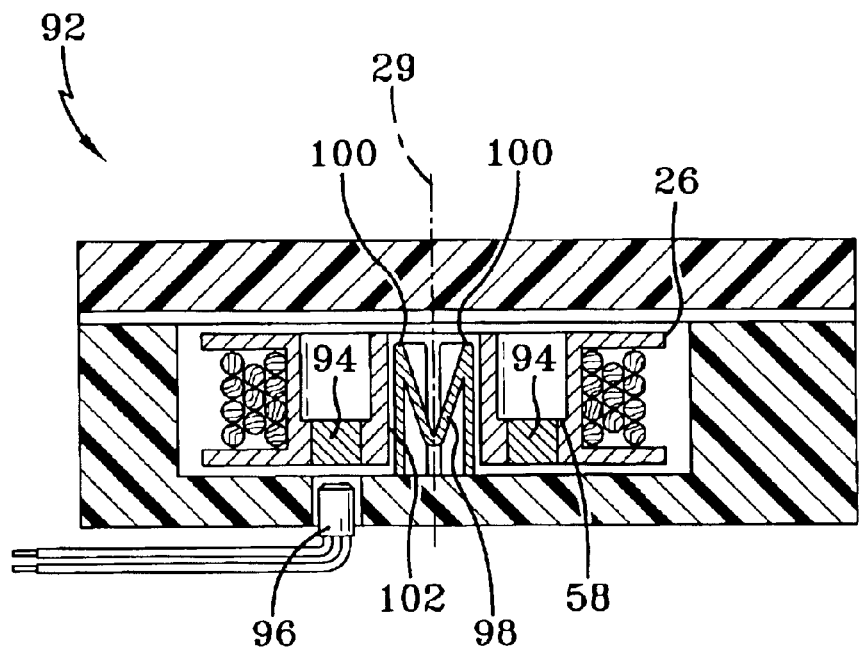
FIG. 5 is a side elevational cross-sectional view of a further alternative embodiment rate sensor of this invention.
Figure 6:
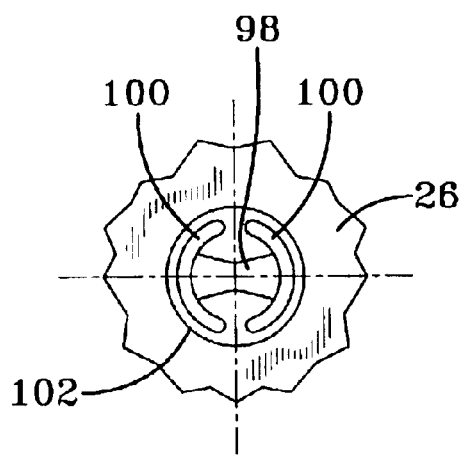
FIG. 6 is a detail top plan view of the outwardly biased stub shaft of the device of FIG. 5.

Yet another alternative embodiment tape dispenser cartridge 92 is shown in FIG. 5. A small high strength magnet 94 such as a neodymium iron boron magnet is positioned within the flange 58 of the spool 26. Rotation of the magnet can be detected by a magnetic flux sensor 96 which could be as simple as a simple loop of conductive wire in which a current flow is induced by the moving magnetic field caused by the magnet. The magnetic flux sensor 96 can also be a Hall sensor, GMR sensor, or reed switch. The detected rotary motion of the magnet corresponds to rotation of the spool 26. As shown in FIGS. 5 and 6, the stub shaft 98 is formed in two brake forming parts 100 which are biased against the inside surface 102 of the inner hub 60 to provide a braking action to overcome the inertia of the spool 26 and the string 34.

Figure 7:
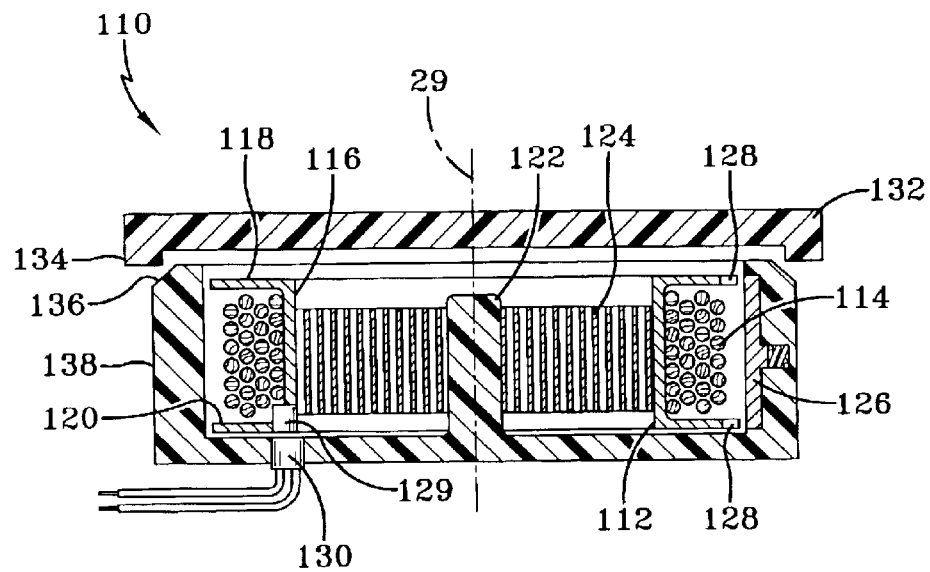
FIG. 7 is a side elevational cross-sectional view of still another alternative embodiment rate sensor of this invention.
Figure 8:
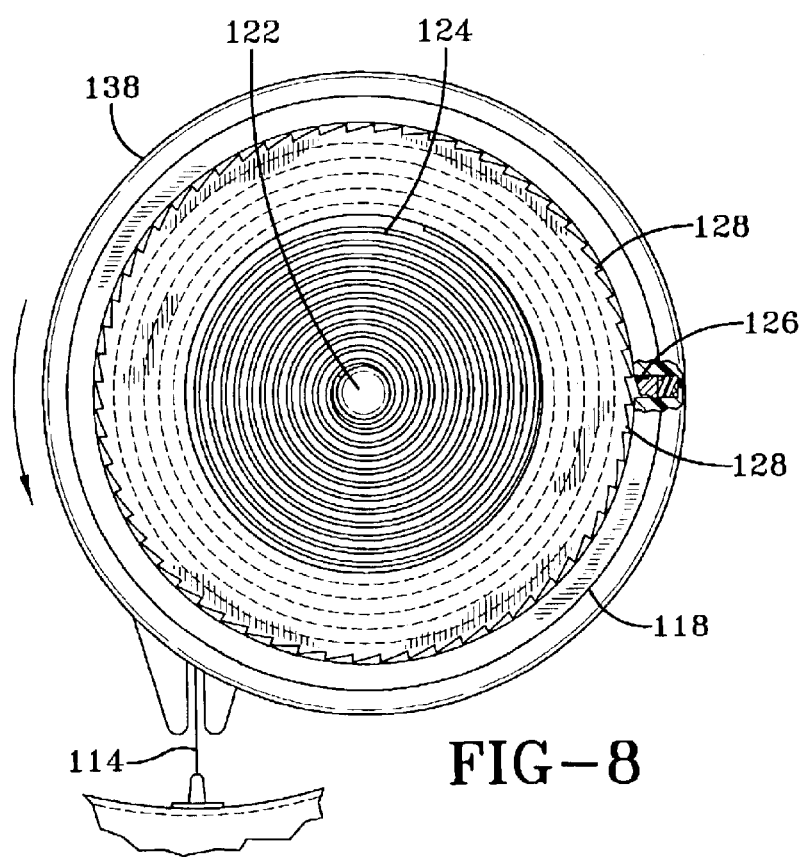
FIG. 8 is a top plan view, partially cut away of the embodiment of FIG. 7.

A still further embodiment tape dispenser cartridge 110 is shown in FIG. 7. The tape dispenser cartridge 110 has a spool 112 on which a quantity of string 114 is wrapped. The spool 112 is defined by a cylindrical inner portion 116 about which the string 114 is wrapped, and an upper flange 118 and a lower flange 120 which extend radially outwardly from the cylindrical inner portion 116. The spool 112 is mounted for rotation about a stub shaft 122 by a coil spring 124 that is attached to both the stub shaft 122 and to the spool 112. The coil spring 124 acts as a brake which resists the string 114 being withdrawn when the airbag to which the string 114 is attached impacts an object and so is no longer moving forward and drawing string from the dispensing cartridge 110. In order to prevent the spring 124 from rewinding the string 114 onto the spool 112, a ratchet mechanism is provided consisting of a pawl 126, and ratchet teeth 128 formed in the peripheral edges of the upper and lower flanges 118, 120. One or more magnets 129 are mounted to the cylindrical portion 116 of the spool 112, and are detected by a magnetic flux sensor 130 such as a Hall sensor, a GMR sensor, a reed switch, or a loop of wire. The dispenser 110 has a cover 132 which has a downwardly extending lip 134 which can be ultrasonically welded to form a hermetic seal with a conical surface 136 on the housing 138 of the tape dispenser 110. FIG. 7 is a partly exploded, view before assembly of the cover 132 to the housing 138.

It should be understood that the string 34, 114 could be replaced by tape, or the tape 90 could be replaced by a string. The string or tape will preferably be made of high strength lightweight material, for example high-strength & high-modulus polyethylene fiber (HSM-PE fiber) or an aromatic (polyamide) fiber. The outlet 142 of the string 34 as shown in FIG. 1 is sealed with a grommet 140 to prevent moisture and other contaminants from migrating into the interior of the cartridge. The grommet 140 is bonded to the string or tape and may be attached by grooves that fit over flanges which protrude from both sides of the outlet. When the tape is extracted from the cartridge, the grommet 140 moves with the string and pulls away from the outlet 142 that it had previously sealed. Another alternative is a sealing material such as wax or an elastomeric such as rubber that forms a seal that likewise pulls away with the spring upon airbag cushion deployment. The outlet 142 presents a smooth radiused curve surface 144 that is axisymmetric about the string so that, as the string is pulled from side to side during the initial stages of inflating the airbag cushion, the string does not bind. The outlet 142 is radiused so the size of the outlet about the string increase as the string moves out of the outlet, so as to prevent high friction caused by the string being pulled over a sharp corner. If a tape is used, the outlet will be tapered on either side of the tape to accommodate side-to-side motion of the tape.

It should be understood that the various braking mechanisms, and the various sensors combined with various light sources or sources of magnetic flux or magnetic shielding could be combined to form additional embodiments of the invention, so that any brake mechanism could be used with any sensor, and vice versa. It should also be understood that for clarity in the illustration the brakes 48, 68, 84, 100 are shown spaced from the spool 26 but in actual practice are engaged with the portion of the spool opposite the brake. In a similar fashion, a gap is shown for clarity between the stub shaft 28 and the inner hub 60 while in practice only as much gap between the stub shaft 28 and inner hub 60 is left as necessary to allow the spool 26 to rotate. Particularly as illustrated in FIGS. 5 and 6, the portions 100 of the stub shaft 98 engage against the inside cylindrical surface 102 of the spool 26.

It should also be understood that the ultrasonic weld illustrated between the cover 132 and the conical surface 136 of the housing 138 could be used with any of the illustrated embodiments.

It is understood that the invention is not limited to the particular construction and arrangement of parts herein illustrated and described, but embraces all such modified forms thereof as come within the scope of the following claims.

I claim:

1. An airbag device a motor vehicle comprising:
   an airbag housing;
   an airbag cushion mounted to the airbag housing, and defining a bag interior surface;
   a cartridge mounted fixed with respect to the airbag housing and containing a quantity of line stored within the cartridge and wound about a spool, the spool being mounted for rotation about an axis within the cartridge, the line passing through the cartridge and extending through an outlet and being attached to the interior surface of the airbag cushion; and
   a sensor positioned within the cartridge for detecting the string or tape being withdrawn from the cartridge, by detecting rotation of the spool.

2. The airbag device of claim 1 further comprising:
   a brake shoe mounted within the cartridge; and
   a spring positioned between a portion of the cartridge and a portion of the brake shoe, to bias the brake shoe to frictionally engage the spool.

3. The airbag device of claim 2 wherein the the spool has an upper flange joined by a cylindrical surface to a lower flange, and wherein the quantity of line is wound about the cylindrical surface, and wherein the brake shoe is biased axially downwardly against the upper flange.

4. The airbag device of claim 2 wherein the the spool has an upper flange joined by a cylindrical surface to a lower flange, and wherein the quantity of line is wound about the cylindrical surface, and wherein the brake shoe is biased axially upwardly against the lower flange.

5. The airbag device of claim 2 wherein the the spool has an upper flange joined by a cylindrical surface to a lower flange, and wherein the quantity of line is wound about the cylindrical surface, and wherein the brake shoe is biased radially inwardly against at least one of the upper flange and lower flange.

6. The airbag device of claim 1 wherein the spool has an innermost cylindrical surface, and rotates about a shaft which is formed in at least two parts which are biased radially outwardly to frictionally engage the innermost cylindrical surface.

7. The airbag device of claim 1 wherein the spool is mounted for rotation about a stub shaft, and further comprising a coil spring mounted between the stub shaft and the spool to resist rotation of the spool.

8. The airbag device of claim 7 wherein the cartridge is comprised of a housing further comprising a ratchet and pawl mechanism positioned between the spool and a portion of the housing so that the coil spring is prevented from rewinding the quantity of line about the spool.

9. The airbag device of claim 1 wherein the spool has an upper side and a lower side, and the sensor is a light source mounted in the cartridge above said upper side and a light sensitive detector in the cartridge below the lower side, so that rotation of the spool causes a variation in the amount of light transmitted from the light source to the light sensor.

10. The airbag device of claim 1 further comprising a magnet mounted to the spool, and wherein the sensor is a magnetic flux sensor that detects the motion of the magnet when the spool rotates.

11. The airbag device of claim 1 further comprising a light source positioned in the cartridge to shine light on the spool, and a light sensor positioned to receive light reflected from the spool, wherein the spool does not reflect light uniformly, so that rotation of the spool can be detected by the variation in reflected light detected by the light sensor.

12. The airbag device of claim 1 further comprising a magnet mounted in the cartridge and a magnetic flux sensor mounted opposite the magnet with the spool positioned therebetween, and mounted to the spool there is at least one magnetic shunt, so that rotation of the spool causes the magnetic shunt to pass between the magnet and the magnetic flux sensor.

13. An airbag device for a motor vehicle comprising:

an airbag housing;

an airbag cushion mounted to the airbag housing, and having portions defining a bag interior surface;

a spool mounted for rotation on the airbag housing;

a string or tape wound about the spool and having a first end attached to the bag interior surface, so that as the airbag cushion is inflated, a portion of the string or tape is withdrawn from the spool, thereby causing the spool to rotate and so unwind the string or tape from the spool;

a brake, and a biasing member mounted with respect to the brake to bias the brake into frictional engagement with the spool, so that when the string or tape is no longer being withdrawn from the spool, the spool will stop rotating; and a sensor fixedly mounted with respect to the airbag housing to detect rotation of the spool.

14. The airbag device of claim 13 further comprising a means for applying a braking force to the spool to overcome the momentum of the spool.

15. The airbag device of claim 13 wherein the means for applying a braking force to the spool comprises:

a braking shoe; and a biasing member which biases the braking shoe into frictional engagement with a portion of the spool.

16. The airbag device of claim 13 wherein the spool has an innermost cylindrical surface, and rotates about a shaft which is formed in at least two parts that are biased radially outwardly to engage the innermost cylindrical surface frictionally.

17. The airbag device of claim 13 wherein the spool is mounted for rotation about a shaft, and further comprising a coil spring mounted between the shaft and the spool to resist rotation of the spool.

18. The airbag device of claim 13 wherein the spool has an upper side and a lower side, and the sensor is a light source mounted above said upper side and a light sensitive detector mounted below the lower side, so that rotation of the spool causes a variation in the amount of light transmitted from the light source to the light sensor.

19. The airbag device of claim 13 further comprising a magnet mounted to the spool, and wherein the sensor is a magnetic flux sensor that detects the motion of the magnet when the spool rotates.

20. The airbag device of claim 13 further comprising a light source positioned to shine light on the spool, and a light sensor positioned to receive light reflected from the spool, wherein the spool does not reflect light uniformly so that rotation of the spool can be detected by variation in reflected light detected by the light sensor.

21. The airbag device of claim 13 wherein the spool has an upper side and a lower side, and a magnet is mounted above said upper side and the sensor is a magnetic flux sensor mounted below the lower side, and the spool has at least one magnetic shunt mounted thereto so that rotation of the spool causes a variation in the amount of magnetic flux transmitted to the magnetic flux sensor.

22. An airbag device for a motor vehicle comprising:

an airbag housing;

an airbag cushion mounted to the airbag housing, and defining a bag interior surface;

a spool mounted for rotation on the airbag housing;

a string wound about the spool having a first end attached to the bag interior surface, so that as the airbag cushion is inflated, a portion of the string is withdrawn from the spool, thereby causing the spool to rotate and so unwind the string from the spool;

a coil spring having a first end fixedly mounted with respect to the airbag housing and a second end mounted to the spool to rotate with the spool, the coil spring opposing the rotation of the spool, and so opposing the portion of the string being withdrawn from the spool; and a sensor fixedly mounted with respect to the airbag housing to detect rotation of the spool.

23. The airbag device of claim 22 further comprising a pawl and ratchet mechanism positioned between the spool and a structure fixed with respect to the airbag housing so as to prevent the spring from causing the spool to rotate to wind string on to the spool.

24. The airbag device of claim 23 wherein the spool has a first flange, and a second flange and a cylindrical surface extending between the first flange and the second flange on which the string is wound, and wherein the first flange has portions forming the ratchet, and a biasing member mounted to the structure fixed with respect to the airbag housing, forming the pawl which engages the portions forming the ratchet.

25. The airbag device of claim 22 further comprising a magnet mounted to the spool, and wherein the sensor is a magnetic flux sensor that detects motion of the magnet when the spool rotates.

* * * * *